US012754764B2

(12) United States Patent
BenHanokh et al.

(10) Patent No.: US 12,754,764 B2
(45) Date of Patent: Oct. 6, 2026

(54) EFFICIENT CONTAINER PACKING IN HOST NODES

(71) Applicant: International Business Machines Corporation, Armonk, NY (US)

(72) Inventors: Gabriel Zvi BenHanokh, Tel Aviv (IL); Orit Wasserman, Mitzpe Aviv (IL)

(73) Assignee: International Business Machines Corporation, Armonk, NY (US)

( * ) Notice: Subject to any disclaimer, the term of this patent is extended or adjusted under 35 U.S.C. 154(b) by 399 days.

(21) Appl. No.: 18/436,361

(22) Filed: Feb. 8, 2024

(65) Prior Publication Data

US 2025/0258700 A1 Aug. 14, 2025

(51) Int. Cl.
*G06F 9/48* (2006.01)

(52) U.S. Cl.
CPC .................................. *G06F 9/4881* (2013.01)

(58) Field of Classification Search
CPC ..... G06F 9/4881; G06F 9/5066; G06F 9/5077
See application file for complete search history.

(56) References Cited

U.S. PATENT DOCUMENTS

| | | | | |
|---|---|---|---|---|
| 11,321,130 | B2 * | 5/2022 | Hallur | G06F 21/53 |
| 2016/0359705 | A1 * | 12/2016 | Parandehgheibi | G06F 16/122 |
| 2017/0285923 | A1 * | 10/2017 | Giral | H04L 41/5058 |
| 2018/0046446 | A1 * | 2/2018 | Turovsky | G06F 9/455 |
| 2019/0138920 | A1 * | 5/2019 | Lin | G06F 16/9027 |
| 2020/0034156 | A1 * | 1/2020 | Chuppala | G06F 9/44505 |
| 2020/0334075 | A1 | 10/2020 | Jägemar et al. | |
| 2021/0103450 | A1 * | 4/2021 | Prasad | G06F 9/45558 |
| 2022/0229695 | A1 * | 7/2022 | Ferreira | G06F 9/5027 |
| 2022/0291956 | A1 | 9/2022 | Zhang et al. | |
| 2023/0094177 | A1 * | 3/2023 | Vajravel | G06F 9/4856 718/100 |
| 2023/0125765 | A1 * | 4/2023 | Aronovich | G06F 9/5022 718/104 |
| 2024/0086370 | A1 * | 3/2024 | McNamee | G06F 16/164 |

(Continued)

FOREIGN PATENT DOCUMENTS

| | | | |
|---|---|---|---|
| CN | 116069481 | B | 7/2023 |

OTHER PUBLICATIONS

Darrous, et al., "On the Importance of Container Image Placement for Service Provisioning int he Edge," ICCCN 2019—28th International Conference on Computer Communication and Networks, Jul. 2019, HAL Portal Inria, Valencia, Spain, accessed Feb. 2, 2024, https://inria.hal.science/hal-02134507/.

(Continued)

*Primary Examiner* — Benjamin C Wu
(74) *Attorney, Agent, or Firm* — Yee & Associates, P.C.

(57) ABSTRACT

Host node container packing is provided. A minimum number of host nodes in a container orchestration environment that satisfies software resource dependencies of each respective container is determined using a dependency graph based on a group of containers that each respective host node of the minimum number of host nodes can run using shared software resources. Each respective group of containers is scheduled to run on a corresponding host node of the minimum number of host nodes using the shared software resources needed by that particular group of containers.

20 Claims, 3 Drawing Sheets

(56) References Cited

U.S. PATENT DOCUMENTS

2025/0258700 A1* 8/2025 BenHanokh .......... G06F 9/4881

OTHER PUBLICATIONS

Funston, et al., "Placement of Virtual Containers on NUMA systems: A Practical and Comprehensive Model," Proceedings of the 2018 USENIX Annual Technical Conference (USENIX ATC '18), Jul. 11-13, 2018, pp. 281-293, USENIX, accessed Feb. 2, 2024, https://www.usenix.org/system/files/conference/atc18/atc18-funston.pdf.

Wang, et al., "Reg: An Ultra-Lightweight Container That Maximizes Memory Sharing and Minimizes the Runtime Environment," 2019 IEEE International Conference on Web Services (ICWS), Aug. 29, 2019, pp. 76-82, IEEE, accessed Feb. 2, 2024, https://ieeexplore.ieee.org/abstract/document/8818398.

XiaoqingBlog, "The pod always scheduling to the same node," xiaoqing blog, Mar. 22, 2023, 11 pages, accessed Feb. 2, 2024, https://midbai.com/en/post/scheduler-always-place-pod-on-the-same-node/.

* cited by examiner

EFFICIENT CONTAINER PACKING IN HOST NODES

BACKGROUND

The disclosure relates generally to container orchestration environments and more specifically to sharing resources among containers running in host nodes of a container orchestration environment.

A container orchestration environment, architecture, platform, or the like, such as, for example, Kubernetes® (a registered trademark of the Linux Foundation of San Francisco, California, USA), provides automated deployment, scaling, and operations of application workloads across clusters of host nodes. A container orchestration environment includes a controller node, which is a main controlling unit of a cluster of host nodes (also known as worker nodes, compute nodes, minions, and the like), managing the cluster's workload, and directing communication across the cluster. A host node is a machine, either physical or virtual, where an application workload is deployed. The host node hosts components of the application workload in a container. A container is the lowest level of a microservice, which holds the running application, libraries, and their dependencies. A container image is an executable package of software that includes everything needed to run the application (e.g., code, runtime, tools, libraries, settings, and the like). The container image becomes the container at runtime.

The controller node consists of various components, such as, for example, a data store, application programming interface (API) server, scheduler, controller, and the like. The data store contains configuration data of the cluster, representing the overall and desired state of the cluster at any given time. The API server provides internal and external interfaces for the controller node. The API server processes and validates resource availability requests and updates state of API objects in the data store. The scheduler selects which host node a container runs on, based on resource availability of respective host nodes. The scheduler tracks resource utilization on each host node to ensure that workload is not scheduled in excess of available resources. The controller has a reconciliation loop that drives actual cluster state toward the desired cluster state, communicating with the API server to create, update, and delete the resources the controller manages (e.g., containers and the like). If the cluster's actual state does not match the desired state, then the controller takes action to fix the problem.

SUMMARY

According to one illustrative embodiment, a computer-implemented method for host node container packing is provided. A computer, using a dependency graph, determines a minimum number of host nodes in a container orchestration environment that satisfies software resource dependencies of each respective container based on a group of containers that each respective host node of the minimum number of host nodes can run using shared software resources. The computer schedules each respective group of containers to run on a corresponding host node of the minimum number of host nodes using the shared software resources needed by that particular group of containers. According to other illustrative embodiments, a computer system and computer program product for host node container packing are provided.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc), or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
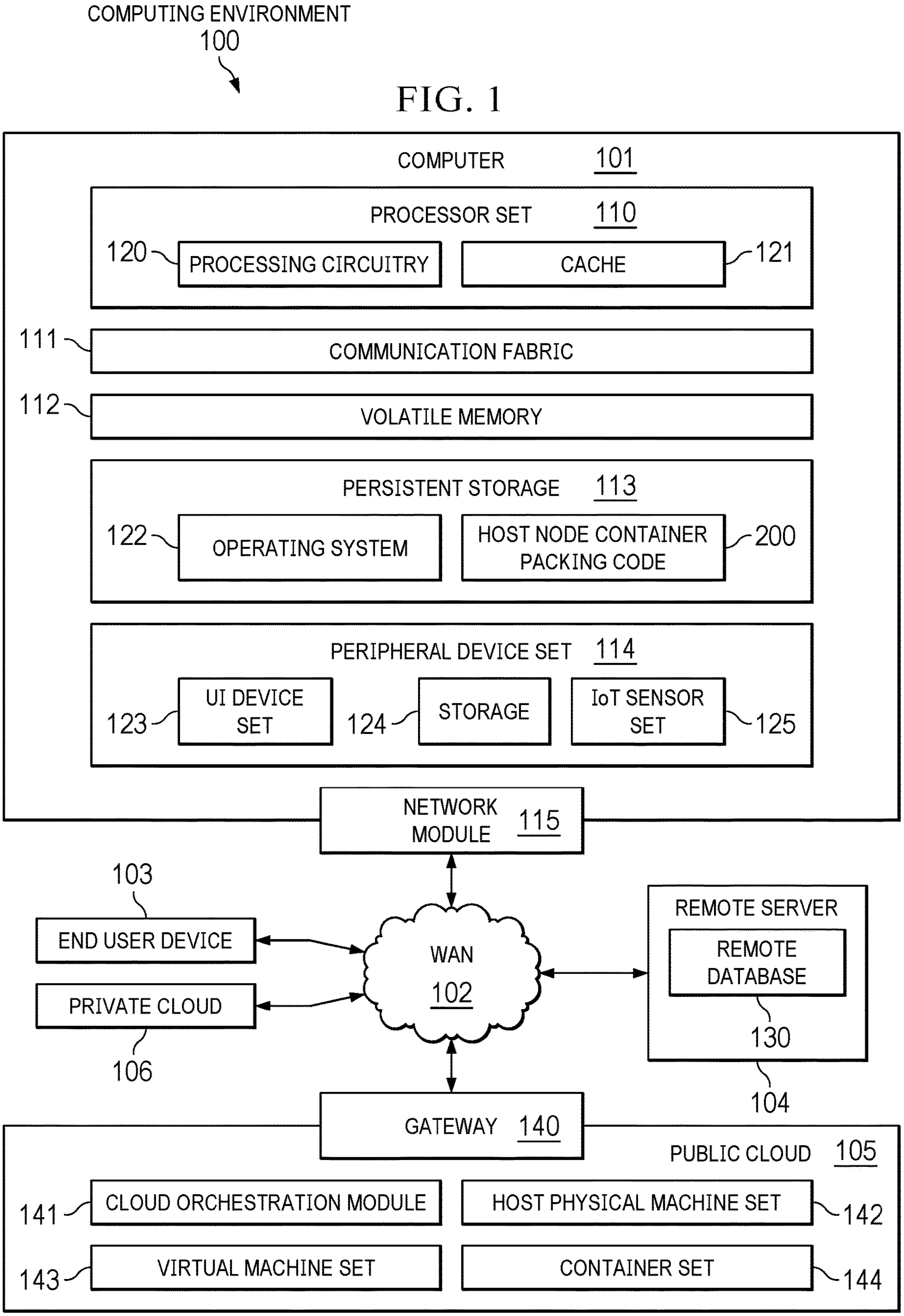
FIG. 1 is a pictorial representation of a computing environment in which illustrative embodiments may be implemented.
Figure 2:
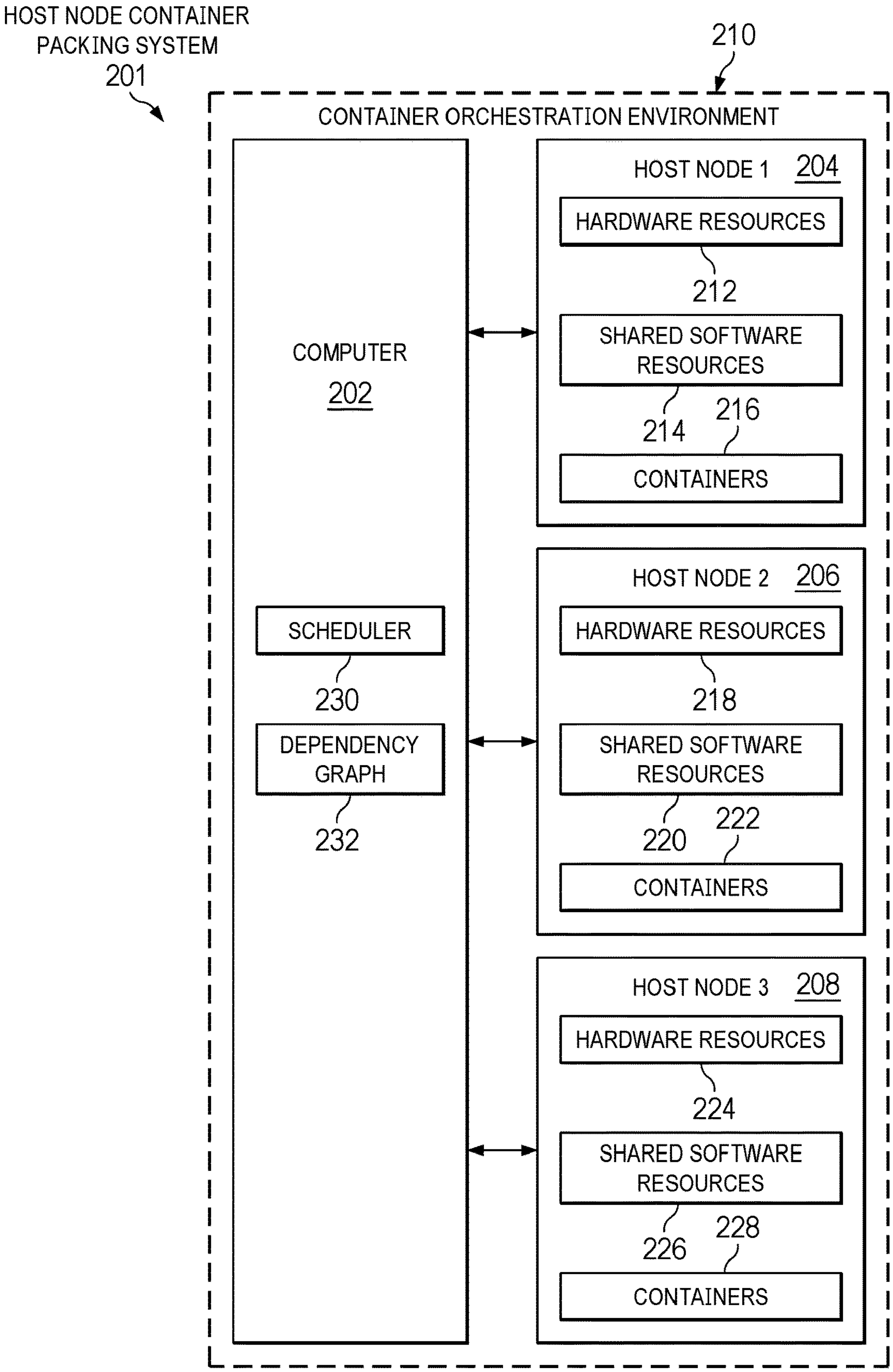
FIG. 2 is a diagram illustrating an example of a host node container packing system in accordance with an illustrative embodiment.

With reference now to the figures, and in particular, with reference to FIG. 1 and FIG. 2, diagrams of data processing environments are provided in which illustrative embodiments may be implemented. It should be appreciated that FIG. 1 and FIG. 2 are only meant as examples and are not intended to assert or imply any limitation with regard to the environments in which different embodiments may be implemented. Many modifications to the depicted environments may be made.

FIG. 1 shows a pictorial representation of a computing environment in which illustrative embodiments may be implemented. Computing environment 100 represents an example of a container orchestration environment for the execution of at least some of the computer code involved in performing the inventive methods of illustrative embodiments, such as host node container packing code 200. For example, host node container packing code 200 maximizes the sharing of software resources or software components between containers. In other words, host node container packing code 200 places as many containers as possible on a single host node where software resource (e.g., library, code, subroutine, package) sharing can be utilized among each of a plurality of containers running on that single host node.

Shared libraries are shared files consisting of a group of non-volatile software resources that includes, for example, configuration data, documentation, code, and the like used by applications. Applications reference this shared file at runtime. An application using a shared library only makes reference to the code that that particular application uses in the shared library. Shared libraries reduce the amount of code that is duplicated in each application that makes use of the shared library, which reduces the size of the application binaries.

In addition, microservices utilize shared libraries. For example, if two microservices are expected to share code, the code can be placed in a shared library. This means that the code is extracted from the microservice and packaged in the shared library so that the other microservice can use it as well. However, an implementation like this requires that the microservices be written to allow for the use of the shared library.

In addition to host node container packing code 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and host node container packing code 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a mainframe computer, quantum computer, desktop computer, laptop computer, tablet computer, or any other form of computer now known or to be developed in the future that is capable of, for example, running a program, accessing a network, and querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods of illustrative embodiments may be stored in host node container packing code 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports, and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data, and re-writing of data. Some familiar forms of persistent storage include magnetic disks and solid-state storage devices. Operating system 122 may take several forms, such as various known proprietary operating systems or opensource Portable Operating System Interface-type operating systems that employ a kernel.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks, and even connections made through wide area networks such as the internet. In various embodiments, UI device set 123 may include components such as a display screen, speaker, microphone, wearable devices (such as smart glasses and smart watches), keyboard, mouse, printer, touchpad, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (e.g., where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (e.g., embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (e.g., the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

EUD 103 is any computer system that is used and controlled by an end user (e.g., a system administrator who utilizes the host node container packing services provided by computer 101), and may take any of the forms discussed above in connection with computer 101. EUD 103 typically receives helpful and useful data from the operations of computer 101. For example, in a hypothetical case where computer 101 is designed to provide a host node container packing recommendation to the end user, this recommendation would typically be communicated from network module 115 of computer 101 through WAN 102 to EUD 103. In this way, EUD 103 can display, or otherwise present, the host node container packing recommendation to the end user. In some embodiments, EUD 103 may be a client device, such as thin client, heavy client, mainframe computer, desktop computer, laptop computer, tablet computer, smart phone, and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a host node container packing recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single entity. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Public cloud 105 and private cloud 106 are programmed and configured to deliver cloud computing services and/or microservices (not separately shown in FIG. 1). Unless otherwise indicated, the word "microservices" shall be interpreted as inclusive of larger "services" regardless of size. Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of application programming interfaces (APIs). One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

As used herein, when used with reference to items, "a set of" means one or more of the items. For example, a set of clouds is one or more different types of cloud environments. Similarly, "a number of," when used with reference to items, means one or more of the items. Moreover, "a group of" or "a plurality of" when used with reference to items, means two or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Containers running on the same host node can share resources instead of duplicating the same resources, which reduces resource consumption (e.g., memory, processor, storage, network bandwidth, and the like). However, when containers reside on separate host nodes such resource sharing is not possible. For example, container 1 and container 2 both are utilizing a shared library, such as a database shared library, and container 1 and container 2 both are running on the same host node. Consequently, container 1 and container 2 can share a single copy of the library. In contrast, container 1 and container 2 are running on two different host nodes. As a result, container 1 and container 2 will each need a separate copy of the library.

Illustrative embodiments maximize the sharing of software resources among containers. In other words, illustrative embodiments place containers on host nodes so that the containers can share the maximum number of software resources (e.g., libraries, software packages, code, subroutines, and the like) located on the host nodes. For example, illustrative embodiments can utilize a greedy algorithm to schedule a container on a host node having the highest number of shared software resources needed by that particular container. Alternatively, illustrative embodiments can schedule a plurality of containers, which utilize the same set of shared software resources, on the same host node. Thus, illustrative embodiments take a holistic view of the container orchestration environment by maximizing the number of containers in host nodes (e.g., container packing of host nodes) to increase application workload efficiency. However, it should be noted that illustrative embodiments may delay running certain containers in some situations to maximize software resource sharing among containers.

Illustrative embodiments first perform an analysis of the container images corresponding to a plurality of containers running in the container orchestration environment to determine the software resource dependencies between certain containers in the container orchestration environment. Illustrative embodiments then build a dependency graph representing the software resource dependencies between those certain containers in the container orchestration environment based on the analysis of the container images corresponding to the plurality of containers running in the container orchestration environment. Using the dependency graph, illustrative embodiments determine a minimum number of host nodes that satisfy the software resource dependencies of each respective container based on a group of containers that each respective host node of the minimum number of host nodes can run using shared software resources. Illustrative embodiments then schedule each respective group of containers on a corresponding host node of the minimum number of host nodes using the shared software resources needed by that particular group of containers.

When scheduling a new container, illustrative embodiments assign the new container to a particular host node of the container orchestration environment having the greatest number of shared software resources the new container needs to run that also can be shared with other containers running in that particular host node. Alternatively, illustrative embodiments can assign the new container to a particular host node based on the accumulated size of all of the shared software resources needed by the new container. As an illustrative example, container C1 needs software resource R1, software resource R2, and software resource R3. Host node N1 has software resource R1 and software resource R2. Host node N2 only has software resource R3. If, for example, illustrative embodiments simply utilize a count of software resources, then illustrative embodiments should place container C1 on host node N1, which has two software resources (i.e., software resource R1 and software resource R2), as opposed to host node N2 which only has one software resource (i.e., software resource R3). However, assume the memory size needed for software resource R3 is greater than the aggregated memory size needed for software resource R1 and software resource R2. As a result, illustrative embodiments schedule container C1 on host node N2 because software resource R3 needs more memory than software resource R1 and software resource R2 combined.

As another illustrative example, the container orchestration environment includes a first set of three containers running a particular runtime, a second set of three containers running a programming language using a corresponding standard library, a third set of three containers running an object-oriented programming language using a virtual machine, and three host nodes to run all three sets of containers. Without using illustrative embodiments, each host node may run one container of each different type. In other words, each host node runs one container running the particular runtime, one container running the programming language using the corresponding standard library, and one container running the object-oriented programming language using the virtual machine. As a result, each host node runs each different type of container (e.g., runtimes, libraries, and the like) without any software resource sharing. Using illustrative embodiments, all three containers of the same type will run on the same host node with full software resource sharing. In other words, illustrative embodiments schedule the first set of three containers running the particular runtime on the first host node, the second set of three containers running the programming language using the corresponding standard library on the second host node, and the third set of three containers running the object-oriented programming language using the virtual machine on the third host node.

Consequently, illustrative embodiments minimize the number of software resource duplications and increase software resource sharing among containers. In other words, illustrative embodiments maximize the number of containers on a host node using the same set of software resources. By containers being able to share more software resources, illustrative embodiments are capable of running more application workload on the same number of existing host nodes, which can decrease the cost per application workload and increase overall container orchestration environment performance.

Thus, illustrative embodiments provide automatic container scheduling that maximizes software resource utilization on host nodes. In contrast, existing container scheduling solutions depend on user input (e.g., rules, tags, or the like). In addition, existing container scheduling solutions do not apply to currently running containers, but only apply to newly generated containers. Moreover, illustrative embodiments apply to software resource sharing where container orchestration environment performance increases with a higher container count because the containers will more likely be in processor or operating system cache. In contrast, existing container scheduling solutions apply to hardware resource sharing where performance decreases with a higher container count as the containers wait longer in queue.

As a result, illustrative embodiments provide one or more technical solutions that overcome a technical problem with an inability of existing container scheduling solutions to maximize software resource sharing among containers running on host nodes. Accordingly, these one or more technical solutions provide a technical effect and practical application in the field of container orchestration environments.

With reference now to FIG. 2, a diagram illustrating an example of a host node container packing system is depicted in accordance with an illustrative embodiment. Host node container packing system 201 may be implemented in a computing environment, such as computing environment 100 in FIG. 1. Host node container packing system 201 is a system of hardware and software components for maximizing the sharing of software resources among a plurality of containers running on the same host node.

In this example, host node container packing system 201 includes computer 202, host node 1 204, host node 2 206, and host node 3 208. Computer 202, host node 1 204, host node 2 206, and host node 3 208 comprise container orchestration environment 210. Computer 202 can be, for example, computer 101 in FIG. 1. Host node 1 204, host node 2 206, and host node 3 208 can be, for example, host physical machine set 142 or virtual machine set 143 in FIG. 1. However, it should be noted that host node container packing system 201 is intended as an example only and not as a limitation on illustrative embodiments. For example, host node container packing system 201 can include any number of computers, host nodes, and other devices and components not shown.

In this example, host node 1 204 includes hardware resources 212, shared software resources 214, and containers 216. Host node 2 206 includes hardware resources 218, shared software resources 220, and containers 222. Host node 3 208 includes hardware resources 224, shared software resources 226, and containers 228. Each of hardware resources 212, hardware resources 218, and hardware resources 224 represents a group of hardware resources, such as, for example, data processing hardware, memory, storage, network hardware, and the like, utilized by host node 1 204, host node 2 206, and host node 3 208, respectively, to run containers 216, containers 222, and containers 228.

Each of containers 216, containers 222, and containers 228 represents a plurality of containers running on host node 1 204, host node 2 206, and host node 3 208, respectively. In addition, each of containers 216, containers 222, and containers 228 can include containers of the same type, containers of different types, or a combination thereof. Containers 216 utilize shared software resources 214, containers 222 utilize shared software resources 220, and containers 228 utilize shared software resources 226.

Shared software resources 214 represent a set of software resources (e.g., at least one of a library, code, subroutine, software package, and the like) that each respective container of containers 216 shares with the other containers of containers 216 during runtime. Similarly, shared software resources 220 represent a set of software resources that each of containers 222 share during runtime and shared software resources 226 represent a set of software resources that each of containers 228 share during runtime.

Computer 202 utilizes scheduler 230 to schedule containers 216, containers 222, and containers 228 to run on the different host nodes (e.g., host node 1 204, host node 2 206, and host node 3 208) of container orchestration environment 210 based on information contained in dependency graph 232. Dependency graph 232 identifies the software resource dependencies among containers in container orchestration environment 210. Computer 202 utilizes the software resource dependency information contained in dependency graph 232 to determine which containers should be grouped together to run on the same host node to maximize software resource sharing among the group of containers that will run on that particular host node. As a result, in this example, computer 202, utilizing scheduler 230, schedules group of containers 216 to run on host node 1 204 using shared software resources 214 between them based their corresponding software resource dependencies, schedules group of containers 222 to run on host node 2 206 using shared software resources 220 between them based their corresponding software resource dependencies, and schedules group of containers 228 to run on host node 3 208 using shared software resources 226 between them based their corresponding software resource dependencies.

Figure 3:
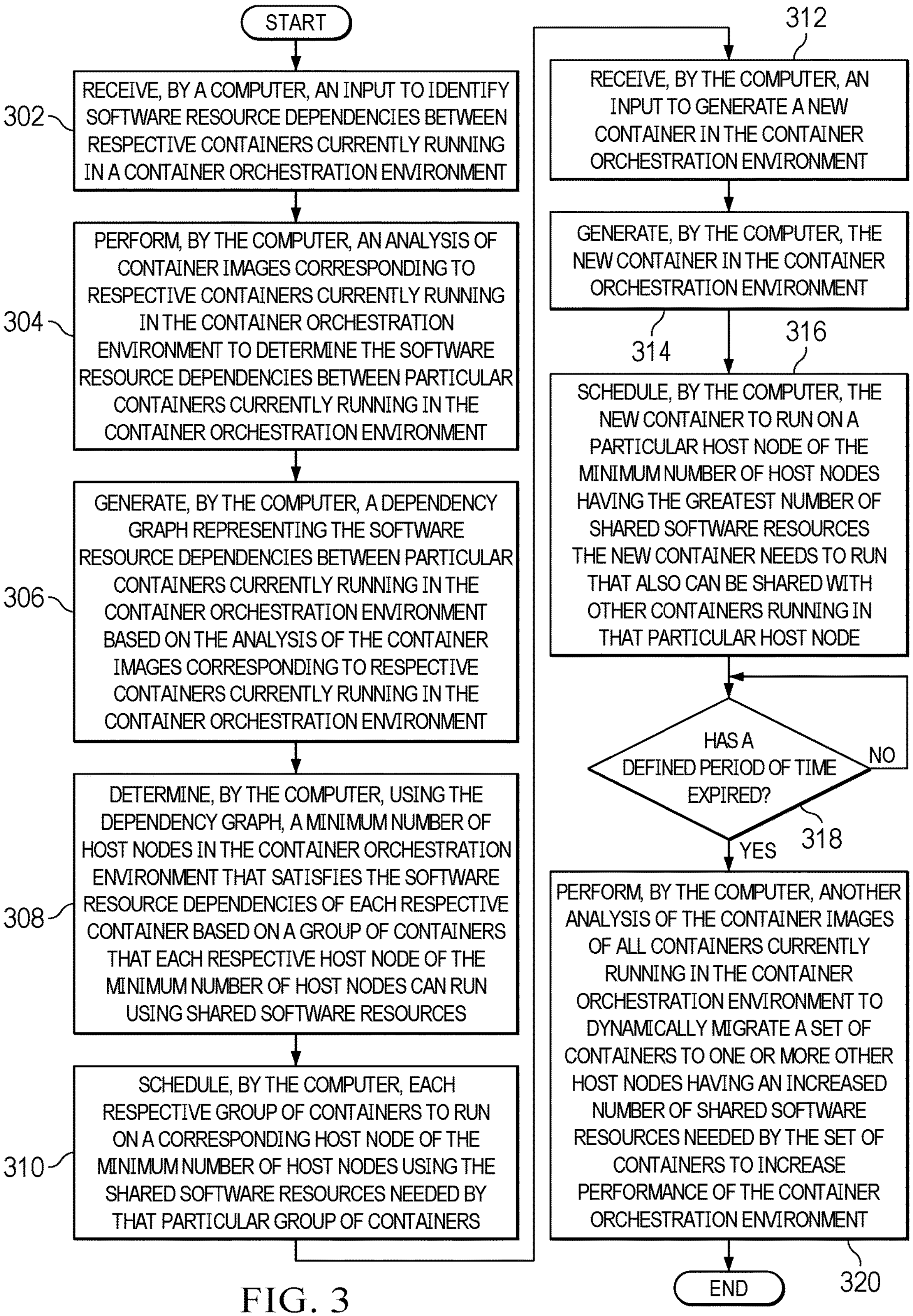
FIG. 3 is a flowchart illustrating a process for host node container packing in accordance with an illustrative embodiment.

With reference now to FIG. 3, a flowchart illustrating a process for host node container packing is shown in accordance with an illustrative embodiment. The process shown in FIG. 3 may be implemented in a computer, such as, for example, computer 101 in FIG. 1 or computer 202 in FIG. 2. For example, the process shown in FIG. 3 may be implemented by host node container packing code 200 in FIG. 1.

The process begins when the computer receives an input to identify software resource dependencies between respective containers currently running in a container orchestration environment (step 302). In response to receiving the input to identify the software resource dependencies, the computer performs an analysis of container images corresponding to respective containers currently running in the container orchestration environment to determine the software resource dependencies between particular containers currently running in the container orchestration environment (step 304).

The computer generates a dependency graph representing the software resource dependencies between particular containers currently running in the container orchestration environment based on the analysis of the container images corresponding to respective containers currently running in the container orchestration environment (step 306). The computer, using the dependency graph, determines a minimum number of host nodes in the container orchestration environment that satisfies the software resource dependencies of each respective container based on a group of containers that each respective host node of the minimum number of host nodes can run using shared software resources (step 308). The computer schedules each respective group of containers to run on a corresponding host node of the minimum number of host nodes using the shared software resources needed by that particular group of containers (step 310).

Subsequently, the computer receives an input to generate a new container in the container orchestration environment (step 312). In response to receiving the input, the computer generates the new container in the container orchestration environment (step 314). In addition, the computer schedules the new container to run on a particular host node of the minimum number of host nodes having the greatest number of shared software resources the new container needs to run that also can be shared with other containers running in that particular host node (step 316).

The computer makes a determination as to whether a defined period of time has expired (step 318). If the computer determines that the defined period of time has not expired, no output of step 318, then the process returns to step 318 where the computer waits for the defined period of time to expire. If the computer determines that the defined period of time has expired, yes output of step 318, then the computer performs another analysis of the container images of all containers currently running in the container orchestration environment to dynamically migrate a set of containers to one or more other host nodes having an increased number of shared software resources needed by the set of containers to increase performance of the container orchestration environment (step 320). Thereafter, the process terminates.

Thus, illustrative embodiments of the present disclosure provide a computer-implemented method, computer system, and computer program product for efficient container packing of host nodes in a container orchestration environment. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for host node container packing, the computer-implemented method comprising:

generating, by a computer, a dependency graph representing software resource dependencies between particular containers currently running in a container orchestration environment based on an analysis of container images corresponding to respective containers currently running in the container orchestration environment;

determining, by the computer, using the dependency graph, a minimum number of host nodes in the container orchestration environment that satisfies software resource dependencies of each respective container based on a group of containers that each respective host node of the minimum number of host nodes can run using shared software resources; and scheduling, by the computer, each respective group of containers to run on a corresponding host node of the minimum number of host nodes using the shared software resources needed by that particular group of containers.

2. The computer-implemented method of claim 1, further comprising:

receiving, by the computer, an input to identify the software resource dependencies between respective containers currently running in the container orchestration environment; and performing, by the computer, an analysis of container images corresponding to respective containers currently running in the container orchestration environment to determine the software resource dependencies between particular containers currently running in the container orchestration environment in response to receiving the input to identify the software resource dependencies.

3. The computer-implemented method of claim 1, further comprising:

receiving, by the computer, an input to generate a new container in the container orchestration environment;

generating, by the computer, the new container in the container orchestration environment in response to receiving the input; and scheduling, by the computer, the new container to run on a particular host node of the minimum number of host nodes having a greatest number of shared software resources the new container needs to run that also can be shared with other containers running in that particular host node.

4. The computer-implemented method of claim 1, further comprising:

performing, by the computer, an analysis of container images of all containers currently running in the container orchestration environment to dynamically migrate a set of containers to one or more other host nodes having an increased number of shared software resources needed by the set of containers to increase performance of the container orchestration environment in response to the computer determining that a defined period of time has expired.

5. The computer-implemented method of claim 1, wherein the computer maximizes sharing of software resources between containers by placing as many containers as possible on a single host node where software resource sharing can be utilized among each of a plurality of containers running on that single host node.

6. The computer-implemented method of claim 1, wherein the computer utilizes a greedy algorithm to schedule a container on a host node having a highest number of shared software resources needed by the container.

7. The computer-implemented method of claim 1, wherein the computer assigns a container to a host node based on an accumulated size of the shared software resources needed by the container.

8. The computer-implemented method of claim 1, wherein the dependency graph identifies, for each respective container of the particular containers currently running in the container orchestration environment, one or more shared software resources comprising at least one of a shared library, code, subroutine, or software package that the respective container utilizes in common with at least one other container currently running in the container orchestration environment.

9. A computer system for host node container packing, the computer system comprising:

a communication fabric;

a set of computer-readable storage media connected to the communication fabric, wherein the set of computer-readable storage media collectively stores program instructions; and a set of processors connected to the communication fabric, wherein the set of processors executes the program instructions to:

generate a dependency graph representing software resource dependencies between particular containers currently running in a container orchestration environment based on an analysis of container images corresponding to respective containers currently running in the container orchestration environment;

determine, using the dependency graph, a minimum number of host nodes in the container orchestration environment that satisfies software resource dependencies of each respective container based on a group of containers that each respective host node of the minimum number of host nodes can run using shared software resources; and schedule each respective group of containers to run on a corresponding host node of the minimum number of host nodes using the shared software resources needed by that particular group of containers.

10. The computer system of claim 9, wherein the set of processors further executes the program instructions to:

receive an input to identify the software resource dependencies between respective containers currently running in the container orchestration environment; and perform an analysis of container images corresponding to respective containers currently running in the container orchestration environment to determine the software resource dependencies between particular containers currently running in the container orchestration environment in response to receiving the input to identify the software resource dependencies.

11. The computer system of claim 9, wherein the set of processors further executes the program instructions to:

receive an input to generate a new container in the container orchestration environment;

generate the new container in the container orchestration environment in response to receiving the input; and schedule the new container to run on a particular host node of the minimum number of host nodes having a greatest number of shared software resources the new container needs to run that also can be shared with other containers running in that particular host node.

12. The computer system of claim 9, wherein the set of processors further executes the program instructions to:

perform an analysis of container images of all containers currently running in the container orchestration environment to dynamically migrate a set of containers to one or more other host nodes having an increased number of shared software resources needed by the set of containers to increase performance of the container orchestration environment in response to determining that a defined period of time has expired.

13. The computer system of claim 9, wherein sharing of software resources is maximized between containers by placing as many containers as possible on a single host node where software resource sharing can be utilized among each of a plurality of containers running on that single host node.

14. The computer system of claim 9, wherein the dependency graph identifies, for each respective container of the particular containers currently running in the container orchestration environment, one or more shared software resources comprising at least one of a shared library, code, subroutine, or software package that the respective container utilizes in common with at least one other container currently running in the container orchestration environment.

15. A computer program product for host node container packing, the computer program product comprising a set of computer-readable storage media having program instructions collectively stored therein, the program instructions executable by a computer to cause the computer to:

generate a dependency graph representing software resource dependencies between particular containers currently running in a container orchestration environment based on an analysis of container images corresponding to respective containers currently running in the container orchestration environment;

determine, using the dependency graph, a minimum number of host nodes in the container orchestration environment that satisfies software resource dependencies of each respective container based on a group of containers that each respective host node of the minimum number of host nodes can run using shared software resources; and schedule each respective group of containers to run on a corresponding host node of the minimum number of host nodes using the shared software resources needed by that particular group of containers.

16. The computer program product of claim 15, wherein the program instructions further cause the computer to:

receive an input to identify the software resource dependencies between respective containers currently running in the container orchestration environment; and perform an analysis of container images corresponding to respective containers currently running in the container orchestration environment to determine the software resource dependencies between particular containers currently running in the container orchestration environment in response to receiving the input to identify the software resource dependencies.

17. The computer program product of claim 15, wherein the program instructions further cause the computer to:

receive an input to generate a new container in the container orchestration environment;

generate the new container in the container orchestration environment in response to receiving the input; and schedule the new container to run on a particular host node of the minimum number of host nodes having a greatest number of shared software resources the new container needs to run that also can be shared with other containers running in that particular host node.

18. The computer program product of claim 15, wherein the program instructions further cause the computer to:

perform an analysis of container images of all containers currently running in the container orchestration environment to dynamically migrate a set of containers to one or more other host nodes having an increased number of shared software resources needed by the set of containers to increase performance of the container orchestration environment in response to determining that a defined period of time has expired.

19. The computer program product of claim 15, wherein the computer maximizes sharing of software resources between containers by placing as many containers as possible on a single host node where software resource sharing can be utilized among each of a plurality of containers running on that single host node.

20. The computer program product of claim 15, wherein the dependency graph identifies, for each respective container of the particular containers currently running in the container orchestration environment, one or more shared software resources comprising at least one of a shared library, code, subroutine, or software package that the respective container utilizes in common with at least one other container currently running in the container orchestration environment.

* * * * *